(12) United States Patent
Lee

(10) Patent No.: US 7,174,859 B2
(45) Date of Patent: Feb. 13, 2007

(54) ADJUSTABLE PET COLLAR

(76) Inventor: Cheng Kai Lee, No. 37, Chen Kung 2$^{nd}$ Rd., Minsiung, Chiayi Hsien (TW)

( * ) Notice: Subject to any disclaimer, the term of this patent is extended or adjusted under 35 U.S.C. 154(b) by 0 days.

(21) Appl. No.: 11/201,129

(22) Filed: Aug. 11, 2005

(65) Prior Publication Data

US 2006/0150924 A1    Jul. 13, 2006

(30) Foreign Application Priority Data

Jan. 12, 2005    (TW) .............................. 94200609 U

(51) Int. Cl.
*A62B 35/00*    (2006.01)
*A44B 1/04*    (2006.01)
*A44B 11/25*    (2006.01)

(52) U.S. Cl. ...................... 119/863; 119/772; 119/856; 119/864; 24/116 R; 2/338; 2/341

(58) Field of Classification Search ....... D30/151–153, D30/134; 119/863, 772, 856, 864, 792, 769, 119/712, 793, 797, 808, 770, 771, 858, 857, 119/907, 654, 815, 653, 855, 850, 859; 24/116 R, 24/656, 115 H, 701, 16 R, 16 PB, 30.5 P; 2/338, 341; D11/86, 200

See application file for complete search history.

(56) References Cited

U.S. PATENT DOCUMENTS 2,159,223 A * 5/1939 Okun ............................ 24/3.6
2,297,661 A * 9/1942 Okun .......................... 24/3.13
2,457,195 A * 12/1948 Bagnall, Jr. .................. 24/3.13
2,531,835 A * 11/1950 Anderson ................. 24/116 R
2,861,313 A * 11/1958 Hermann ................... 24/115 H
3,867,905 A * 2/1975 Vail, Jr. ...................... 119/793
4,398,500 A * 8/1983 Koronkiewicz ............. 119/793
6,095,094 A * 8/2000 Phillips ...................... 119/792
6,374,778 B1 * 4/2002 Glussich ..................... 119/859

FOREIGN PATENT DOCUMENTS

WO    WO 90/00857    * 2/1990

* cited by examiner

*Primary Examiner*—Andrea M. Valenti
(74) *Attorney, Agent, or Firm*—Birch, Stewart, Kolasch & Birch, LLP

(57) ABSTRACT

An adjustable pet collar comprises a long chain and an adjuster. The adjuster is constructed by a upper cover and seat body, in which a slit is opened on the upper cover and a slanting channel is disposed on the seat body. The chain is placed in the channel, and a sliding groove in which one end thereof is closed perpendicular to the channel is disposed at one side of the channel, and a recess groove is disposed at another end thereof. An inserting pin seat is installed in the sliding groove, and an elastic element is installed between the inserting pin seat and the closed end of the sliding groove. Whereby, the size of the collar formed by the chain is adjusted by the inserting pin seat.

7 Claims, 6 Drawing Sheets

ADJUSTABLE PET COLLAR

BACKGROUND OF THE INVENTION

1. Field of the Invention

The present invention relates to an adjustable pet collar, and more particularly to a chain type of pet collar with a movable inserting pin for adjusting the size of the pet collar.

2. Description of Related Art

When a person goes out to walk a dog, for stopping the dog running around disorderly, he always use a chain or leather belt to put around the dog's neck. A market available pet collar at present, as FIG. 1 show, is a long chain 1. The chain 1 is constructed by two circular rings 2, a plurality of chain units 3 engaged with each other and a rotating ring 4. When the components mentioned above wants to be combined into a collar, insert the chain units 3 into one of the circular rings 2, and then hook the rotating ring 3 with another circular ring 2 so as to form a simple pet collar However, because the size of this kind of collar cannot be fixed when a user put the collar around a pet's neck and also because of a pet's unstable behavior, either the size of the collar tends to be enlarged owing to too small a pull force exerted by the user, the pet is easy to be loosened from the collar, or the pull force exerted by the user is so large that the collar is shrunk to tie the pet's neck too tight.

SUMMARY OF THE INVENTION

One object of the present invention is to provide an adjustable pet collar; the size thereof is capable of being adjusted by means of the locking and the releasing functions of an inserting pin and spring set to allow the chain to be fixed or moved and allow the adjustment of the chain collar to be quick and accurate.

For attaining to the object mentioned above, an adjustable pet collar comprises a long chain and adjuster, in which the adjuster is formed by a upper cover and a seat body. A slanting channel in which a chain is installed is disposed on the seat body. A sliding groove with a closed end and perpendicular to the channel is disposed at one flank side of the channel and a recess groove is disposed at another flank side thereof. An inserting pin seat facilitated with an inserting pin is installed in the sliding groove and an elastic element is inserted between the inserting pin seat and the close end of the sliding groove. Therefore, the chain can be controlled to move or lock so as to adjust the size of the collar by means of the locking and the releasing functions of the inserting pin induced by the spring.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can be more fully understood by reference to the following description and accompanying drawings which are given by way of illustration only, and thus are not limitative of the present invention, and in which.

DETAILED DESCRIPTION OF THE PREFERRED EMBODIMENTS

Figure 1:
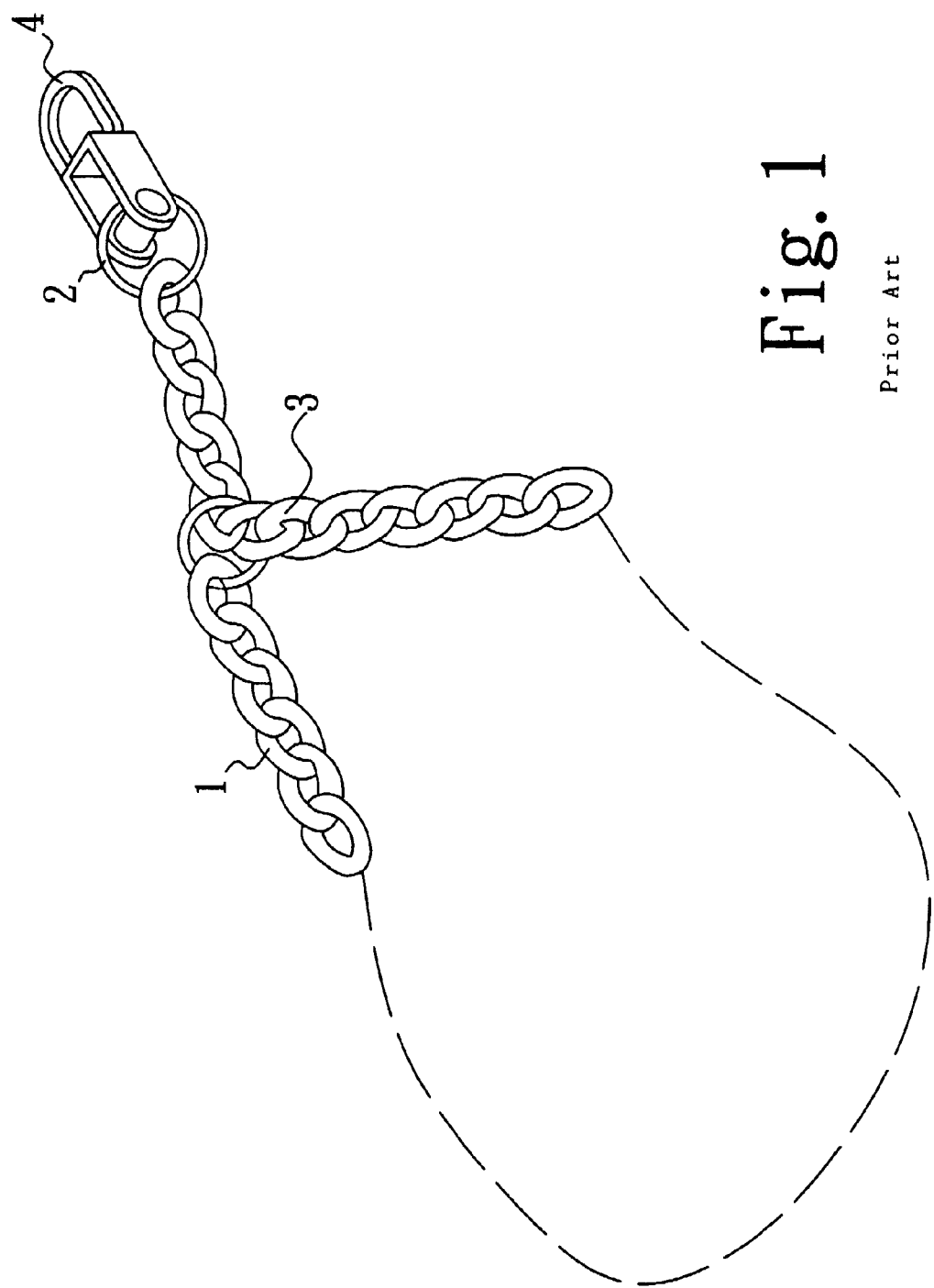
FIG. 1 is a perspective view, showing a conventional pet collar structure.
Figure 2:
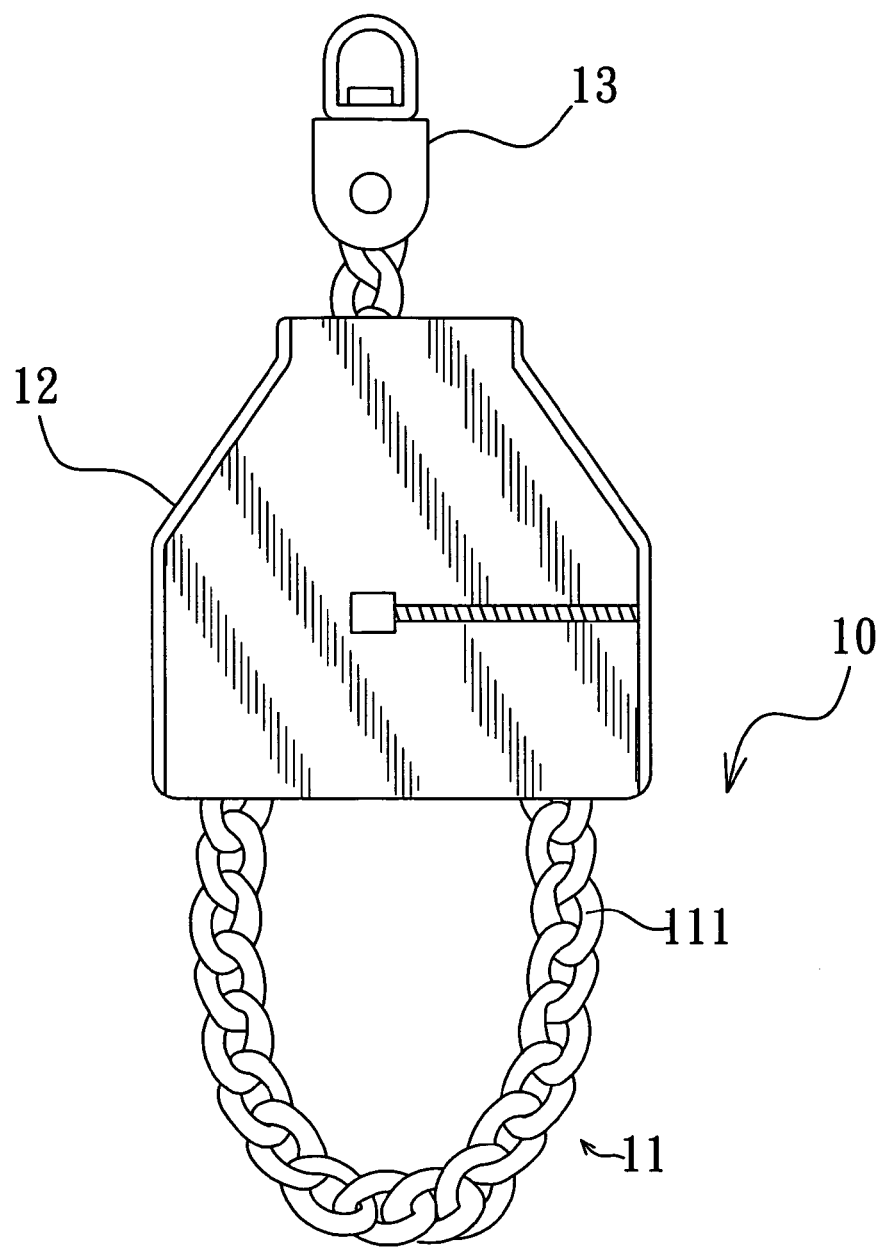
FIG. 2 is a perspective view, showing a structure of an adjustable pet collar of a preferred embodiment according to the present invention.

Please refer to FIG. 2. A pet collar comprises a chain 11, adjuster 12 and rotating ring 13, in which one end of the chain 11 is fixed to the rotating ring 13, and another end thereof is fixed in the adjuster 12 after the middle part thereof is passed through the adjuster 12.

Figure 3:
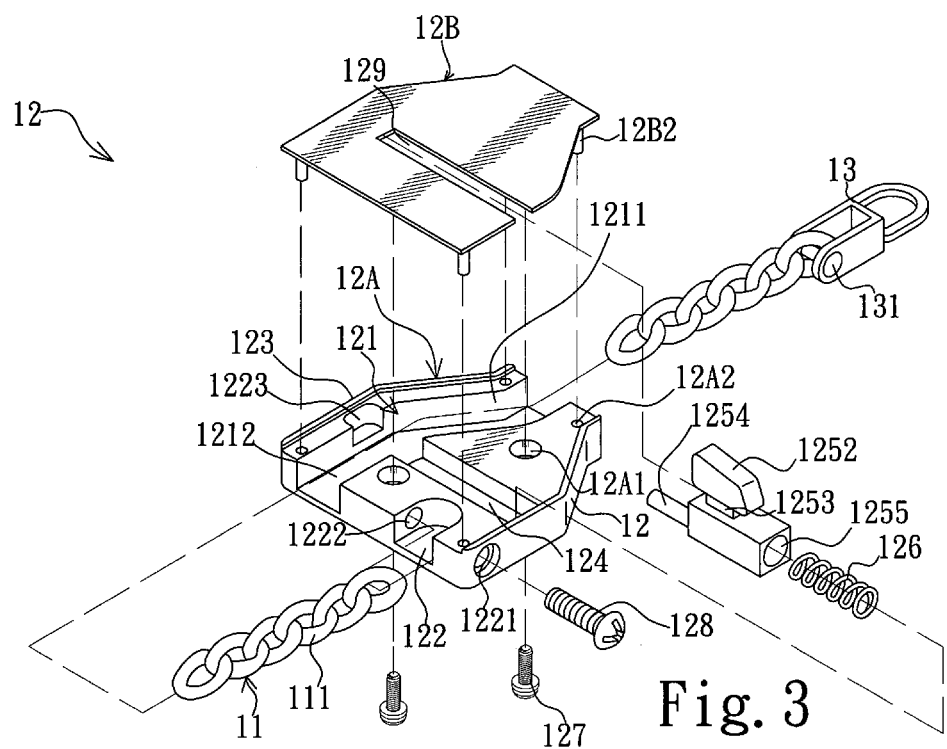
FIG. 3 is an exploded view, showing a structure of an adjustable pet collar of a preferred embodiment according to the present invention.

Next, please refer to FIG. 3. FIG. 3 is an explosive view showing a pet collar of a first preferred embodiment according to the present invention. One end of the chain 11 is fixed to the rotating ring 13 through a rivet 131. The adjuster 12 comprises a seat body 12A and upper cover 12B. The seat body 12A and the upper cover 12B all are a piece body with a upper part formed as a trapezoid shape and a lower part formed as a rectangle shape. A small flange 123 is protruded upward at each of two flank sides of the seat body 12A and a groove type of slanting channel 121, divided into a upper section 1211 and lower section 1212, is disposed thereon. The upper and the lower sections 1211 and 1212 whose shapes are all similar to a string are respectively parallel to the outlines of the trapezoid and the rectangle. Consequently, an angle must be formed between the upper and the lower sections 1211 and 1212. The formation of such kind of angle can prevent the chain 11 from falling down owing to the gravity and is helpful in pulling the chain 11 stably when the size of the collar 10 is being adjusted. A sliding groove 124 with one end thereof perpendicular to and communicated with the lower section 1212 and another end thereof closed is disposed at one side of the slanting channel 121. Furthermore, a recess groove 1223 corresponding to the sliding groove 124 is disposed at another side of the lower section 1212. An inserting pin seat 125 and a spring 126 can be accepted in the sliding groove 124. the inserting pin seat 125 has a main body 1251, pushing mass 1252 and connecting neck 1253, in which the main body 1251 with one side thereof disposed with an inserting pin 1254 used for inserting into the chain unit 111 of the chain 11 when the size of the collar 10 is being adjusted is installed in the groove. A circular hole 1255 used for accepting a spring 126 is disposed at another side of the main body 1251. Here, the spring 126 is then propped against the circular hole 1255 and the closed end of the sliding groove 124. Besides, a chain fixing notch 122 is disposed below the sliding groove 124 of the seat body 12A, in which a through hole 1221 is disposed between one side of the fixing notch 122 and the rim of the seat body 12A and an accepting groove 1222 is disposed at another side thereof. Furthermore, a plurality of through holes 12A1 are separately disposed on the seat body 12A and a fixing hole 12A2 is disposed on each of the four corners thereof. And, the upper cover 12B is a thinner plate on which a slit 129 with one end thereof closed and another end thereof opened and corresponding to the sliding groove 124. The pushing mass 1252 of the main body 1251 is extended out of the adjuster 12 by disposing the connecting neck 1253 in the slit 129. Besides, a plurality of screw accepting seat 12B1 and fixing pins respectively corresponding to the through holes 12A1 and the fixing 12A2 on the seat body 12A are also disposed on the upper cover 12B; screws passed through the through holes 12A1 can be fixed in the accepting seats 12B1, as FIG. 4 shows.

Figure 4:
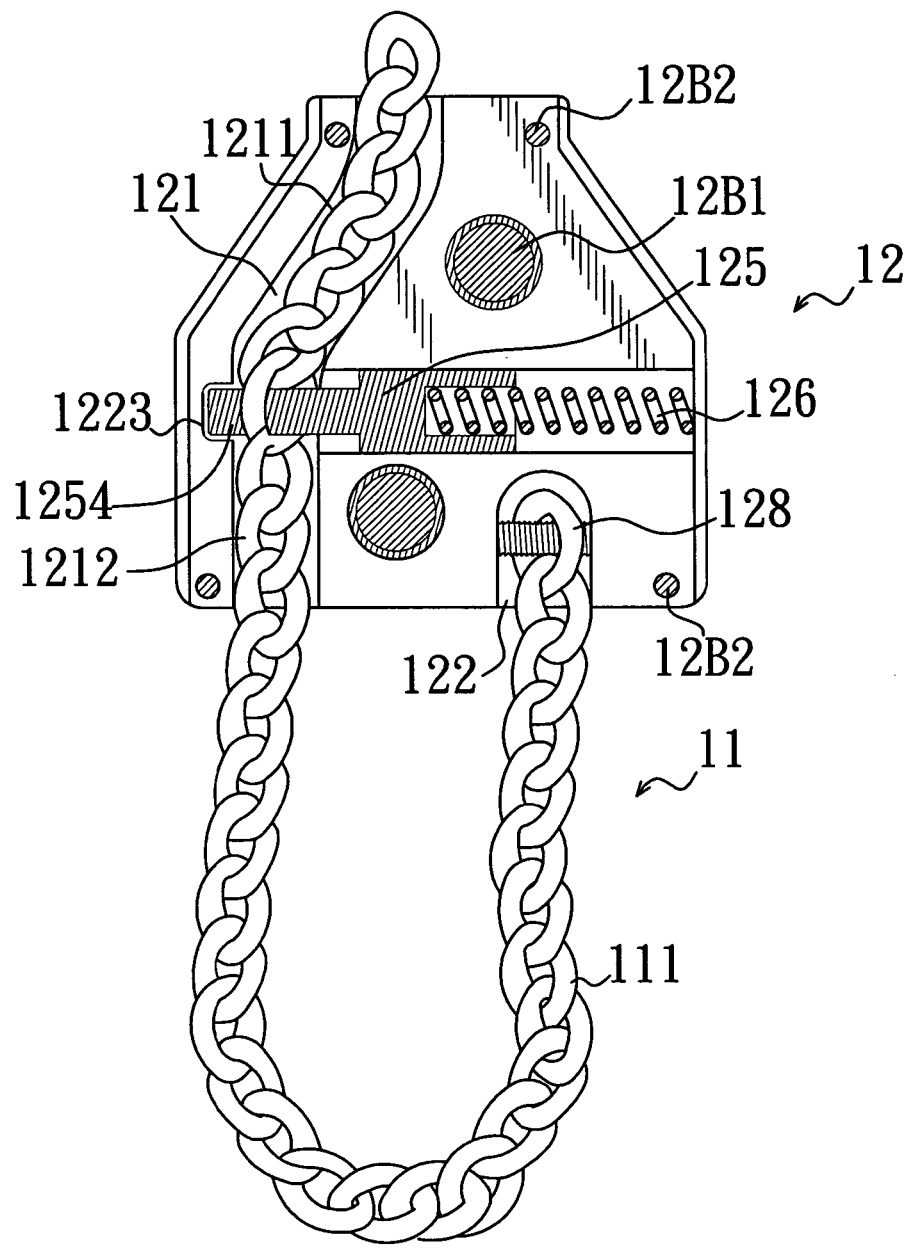
FIG. 4 is a cross sectional view, showing a structure of an adjustable pet collar of a preferred embodiment according to the present invention after being adjusted.

Please refer to FIG. 4. When an adjustable pet collar according to the present invention is to be assembled, The chain 11 is placed into the slanting channel 121, and a screw 128 is passed through the through hole 1221 and then the chain unit 111 at one end of the chain 11 to screw tightly in the accepting groove 1222 after the chain unit 111 is inserted into the fixing groove 122 to cause the one end of the chain 11 to be fixed in the adjuster 12. Furthermore, the combination of the inserting pin 125 and the spring 126 is placed in the sliding groove 12. The inserting pin 1254 at the front end of the inserting pin seat 125 will automatically pass through the chain unit 111 of the chain 11 and is got stuck in the recess groove 1223 at the opposite side to the sliding groove 12 owing to the elastic force of the spring 126. Finally, the fixing pins 12B2 of the upper cover 12B are aimed at the fixing holes 12A2 of the seat body 12A, and the upper cover 12B is covered on the seat body 12A and placed in the range within the flange 123 after the pushing mass 1252 of the inserting pin seat 125 is extended out of the slit 129. Thereafter, screws 127 are passed through the through holes 121A and fixed in the screw accepting seat 12B1 so that an adjustable pet collar according to the present invention is combined by fixing the upper cover 12B and the seat body together.

Figure 5:
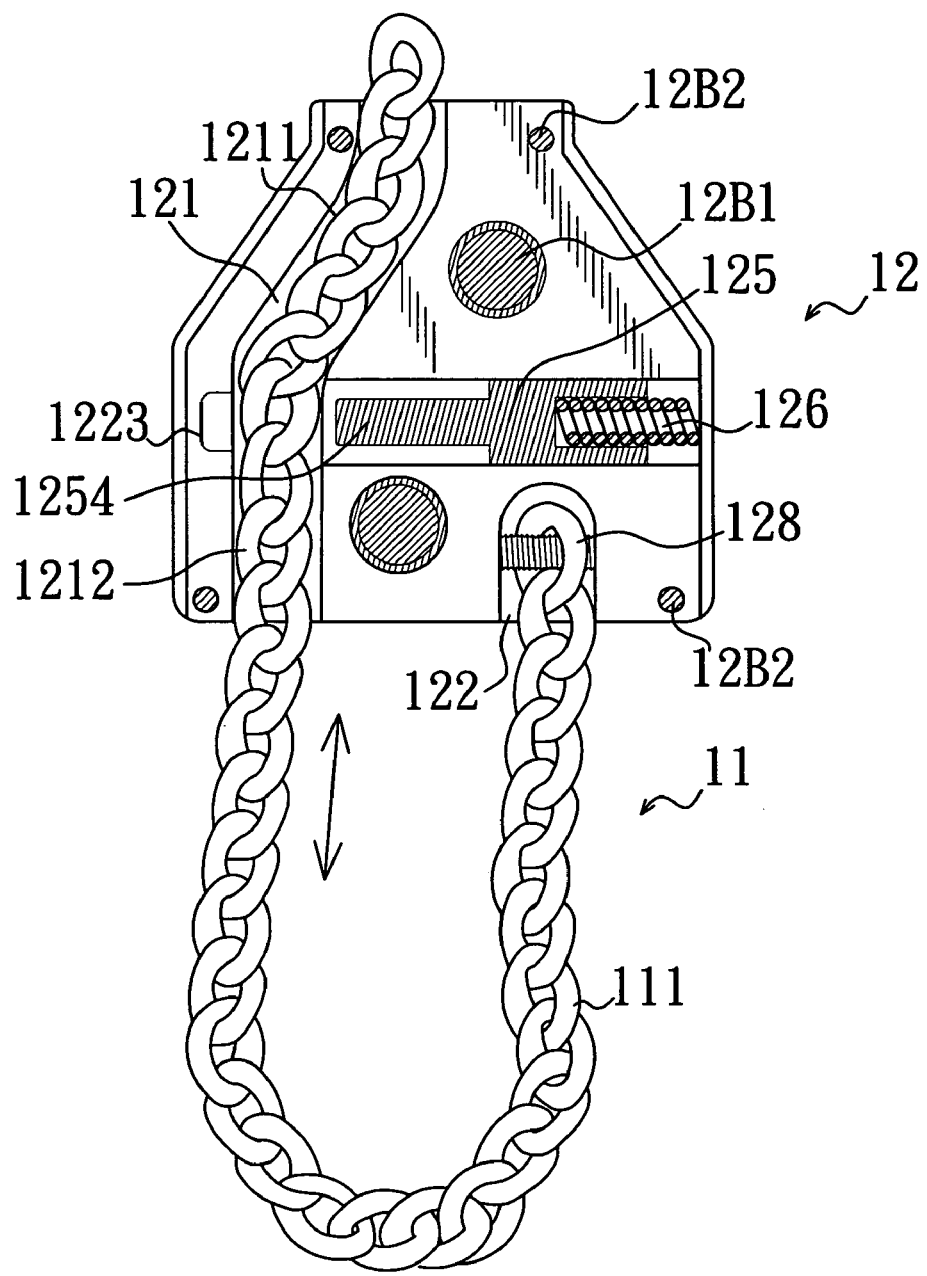
FIG. 5 is a cross sectional view, showing a structure of an adjustable pet collar of a preferred embodiment according to the present invention while being adjusted.

Please refer to FIG. 5. Push the pushing mass 1252 of the inserting pin seat 125 afterward to cause the inserting pin 1254 to be released from the chain unit 111 when the size of the collar 10 is to be adjusted. Pull the chain 11 upward or downward to change the size of the collar 10 at this time. Release the pushing mass 1252 and the inserting pin will be rebounded back to insert into the chain unit 111 by means of the elastic force of the spring 126, as FIG. 4 shows. Thereafter, the adjustment of the size of the collar 10 is completed.

Figure 6:
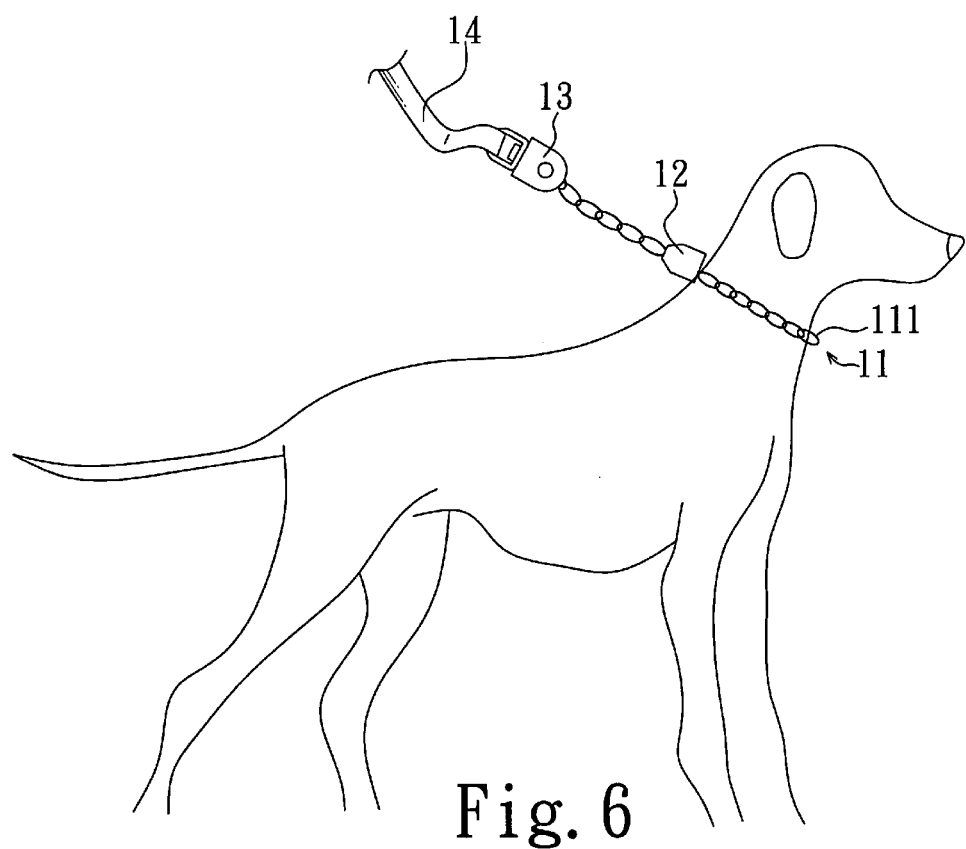
FIG. 6 is a schematic view, showing a structure of an adjustable pet collar of a preferred embodiment according to the present invention in practice.

Furthermore, as FIG. 6 shows, according to the adjustable collar of the present invention, a leather belt or nylon woven rope 14 can be connected to the collar at the rotating ring 13 so as to allow a master to carry the collar 10 put around a dog's neck conveniently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adjustable pet collar, comprising: a long chain; an adjuster, constructed by a upper cover and seat body, a slit being opened on said upper cover and a slanting channel is disposed on said seat body, said chain being placed through said channel, and a sliding groove in which one end thereof is closed perpendicular to said channel being disposed at one side of said channel, and a recess groove being disposed at another end thereof, an inserting pin seat being installed in said sliding groove, an elastic element being installed between said inserting pin seat and the closed end of said sliding groove; whereby, the size of said collar formed by said chain is adjusted by said inserting pin seat, said inserting pin seat including a main body, located in said sliding groove, a circular hole for accepting said elastic element is disposed at one end of said main body propped against by said elastic element and a inserting pin for being inserted into a chain unit of said chain is disposed at another end thereof; a pushing mass, extended out of said slit opened on said upper cover; and a connecting neck, disposed between said main body and said pushing mass, the width thereof is smaller than the width of said slit and is installed in said slit.

2. The collar according to claim 1, wherein one end of said chain is fixed in said seat body.

3. The collar according to claim 1, wherein said slanting channel is constructed by a upper section and lower section respectively formed as a straight line, and an angle is formed between said upper section and said lower section.

4. The collar according to claim 1, wherein said elastic element is a spring.

5. The collar according to claim 1, wherein said upper cover and said seat body are combined by screws.

6. The collar according to claim 2, wherein another end of said chain is connected to a rotating ring.

7. The collar according to claim 6, wherein a leather belt or a nylon woven rope is connected to another end of said rotating ring not connected to said chain.

* * * * *